(12) United States Patent
Liu et al.

(10) Patent No.: US 9,917,710 B2
(45) Date of Patent: Mar. 13, 2018

(54) ADAPTIVE EQUALIZER, ADAPTIVE EQUALIZATION METHOD AND RECEIVER

(71) Applicants: FUJITSU LIMITED, Kawasaki-shi, Kanagawa (JP); SOCIONEXT INC., Yokohama-shi, Kanagawa (JP)

(72) Inventors: Bo Liu, Beijing (CN); Weizhen Yan, Beijing (CN); Lei Li, Beijing (CN); Hao Chen, Beijing (CN); Andrzej Radecki, Maidenhead (GB)

(73) Assignees: FUJITSU LIMITED, Kawasaki (JP); SOCIONEXT INC., Yokohama (JP)

( * ) Notice: Subject to any disclaimer, the term of this patent is extended or adjusted under 35 U.S.C. 154(b) by 0 days.

(21) Appl. No.: 15/332,471

(22) Filed: Oct. 24, 2016

(65) Prior Publication Data

US 2017/0041164 A1 Feb. 9, 2017

Related U.S. Application Data

(63) Continuation of application No. PCT/CN2015/073598, filed on Mar. 4, 2015.

(30) Foreign Application Priority Data

Apr. 24, 2014 (CN) .......................... 2014 1 0168797

(51) Int. Cl.
*H04L 25/03* (2006.01)
*H04L 5/00* (2006.01)
*H04L 27/26* (2006.01)

(52) U.S. Cl.
CPC ........ *H04L 25/03057* (2013.01); *H04L 5/006* (2013.01); *H04L 25/03* (2013.01); *H04L 27/265* (2013.01); *H04L 2025/03636* (2013.01)

(58) Field of Classification Search
CPC . H04L 25/03057; H04L 5/006; H04L 27/265; H04L 25/03019; H04L 25/03
See application file for complete search history.

(56) References Cited

U.S. PATENT DOCUMENTS

| 5,903,608 A | 5/1999 | Chun |
| 6,608,864 B1 | 8/2003 | Strait |

(Continued)

FOREIGN PATENT DOCUMENTS

| CN | 101335551 | 12/2008 |
| CN | 101741804 | 6/2010 |

(Continued)

OTHER PUBLICATIONS

Iijun Sun et al., 'A Novel Frequency Domain Equalization Algorithm for SC-FDE System', 2009 Pacific-Asia Conference on Knowledge Engineering and Software Engineering, 2009 pp. 132-135.

(Continued)

*Primary Examiner* — Jean B Corrielus
(74) *Attorney, Agent, or Firm* — Staas & Halsey LLP (57) ABSTRACT

An adaptive equalizer, an adaptive equalization method and receiver are disclosed where the adaptive equalizer is used for performing adaptive equalization processing on a frequency-domain signal, a channel used by the frequency-domain signal containing multiple subcarriers, the adaptive equalizer comprises: an equalizer coefficient generating unit configured to, for each subcarrier, generate an equalizer coefficient to which the subcarrier corresponds according to channel information and a step length of the subcarrier; where different subcarriers correspond to different step lengths and an equalization processing unit configured to, for each subcarrier, perform equalization processing on a signal in the subcarrier by using the equalizer coefficient.

15 Claims, 7 Drawing Sheets

(56) References Cited

U.S. PATENT DOCUMENTS

| | | | |
|---|---|---|---|
| 6,907,064 B1* | 6/2005 | Tokunaga | H03H 21/0012 375/229 |
| 8,081,690 B2 | 12/2011 | Ma et al. | |
| 8,594,211 B2 | 11/2013 | Ahmad | |
| 2001/0036225 A1 | 11/2001 | Murata | |
| 2005/0013353 A1 | 1/2005 | Alloin | |
| 2006/0029126 A1* | 2/2006 | Chang | H04L 25/03057 375/232 |
| 2006/0034362 A1 | 2/2006 | Kim et al. | |
| 2009/0285314 A1 | 11/2009 | Yousef et al. | |
| 2014/0328380 A1* | 11/2014 | Pustovalov | H04L 25/03885 375/232 |

FOREIGN PATENT DOCUMENTS

| | | |
|---|---|---|
| CN | 101997790 | 3/2011 |
| CN | 102594374 | 7/2012 |
| CN | 102769599 | 11/2012 |
| GB | 2485427 | 5/2012 |
| GB | 2503073 | 12/2013 |
| JP | 2001-313594 | 11/2001 |
| JP | 2012-23670 | 2/2012 |
| KR | 10-0331437 | 3/2002 |
| WO | 2013/100781 | 7/2013 |

OTHER PUBLICATIONS

Huang et al., 'Low-complexity Subspace Tracking Based Channel Estimation Method for OFDM Systems in Time-Varying Channels', Communications, 2006. ICC '06. IEEE International, 2006, pp. 4618-4623.

"Improved variable step-size frequency-domain LMS adaptive filtering algorithm" Computer Engineering and Applications, 2009, 45 ( 1 ) : 17-21.

International Search Report dated Jun. 3, 2015 in corresponding International Application No. PCT/CN2015/073598.

Written Opinion of the International Searching Authority dated Jun. 3, 2015, in corresponding International Application No. PCT/CN2015/073598.

Japanese Office Action dated Oct. 24, 2017 in Japanese Patent Application No. 2016-563415.

Extended European Search Report dated Sep. 11, 2017 in European Patent Application No. 15782326.1.

Waldhauser D S et al:" Adaptive decision feedback equalization for filter bank based multicarrier systems", Circuits and Systems, 2009. ISCAS 2009. IEEE International Symposium on, IEEE, Piscataway, NJ, USA, May 24, 2009 (May 24, 2009), pp. 2794-2797, XP031479824.

Japanese Office Action dated Jan. 23, 2018 in corresponding Japanese Patent Application No. 2016-563415, 2 pages.

* cited by examiner

ADAPTIVE EQUALIZER, ADAPTIVE EQUALIZATION METHOD AND RECEIVER

CROSS-REFERENCE TO RELATED APPLICATIONS

This application is a continuation application, filed under 35 U.S.C. § 111(a), of International Application PCT/CN2015/073598 filed on Mar. 4, 2015 and claims foreign priority to Chinese Patent Application No. 201410168797.6, filed Apr. 24, 2014, the content of which is incorporated herein by reference in its entirety.

BACKGROUND

1. Field

The present disclosure relates to the field of communications, and in particular to an adaptive equalizer, an adaptive equalization method and a receiver.

2. Description of the Related Art

Multicarrier communication technologies, such as a discrete multi-tone (DMT) modulation technology and an orthogonal frequency division multiplexing (OFDM) technology, etc., are widely used in optical communication systems, and are featured in that a channel is allocated with different modulation formats after being divided into multiple subcarriers according to a signal to noise ratio of each subcarrier.

In the multicarrier communication technologies, a communication effect is very sensitive to a change of a channel, and both a response characteristic of the channel and a change of a noise will result in increase of a bit error rate of transmission. Hence, the channel needs to be tracked and performed adaptive equalization processing. Existing adaptive equalization processing is often based on an iteration algorithm, that is, an iteration operation is performed according to an initial equalizer coefficient and step length, so as to generate an equalizer coefficient, for use in the adaptive equalization processing.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Additional aspects and/or advantages will be set forth in part in the description which follows and, in part, will be apparent from the description, or may be learned by practice of the embodiments.

In the related art, for different subcarriers, it is often to perform adaptive equalization processing by using a fixed initial equalizer coefficient and a step length. Hence, identical adaptive equalization processing is performed for the subcarriers, and no tracking and equalization processing can be performed for changes of channels of the subcarriers. However, as each subcarrier is very high in bandwidth utilization and is relatively sensitive to a change of a channel, in a multicarrier communication system, both a response characteristic of the channel and a change of a noise will result in increase of a bit error rate of transmission. Hence, tracking and equalization processing need to be performed for changes of channels of the subcarriers.

Embodiments of the present disclosure provide an adaptive equalizer, adaptive equalization method and a receiver, which are applicable to a multicarrier communication system, and are able to perform different adaptive equalization processing for subcarriers.

According to a first aspect of the embodiments of the present disclosure, there is provided an adaptive equalizer, used to perform adaptive equalization processing on a frequency-domain signal, a channel used by the frequency-domain signal containing multiple subcarriers, the adaptive equalizer including:

an equalizer coefficient generating unit configured to, for each subcarrier, generate an equalizer coefficient to which the subcarrier corresponds according to channel information and a step length of the subcarrier, different subcarriers correspond to different step lengths; and an equalization processing unit configured to, for each subcarrier, perform equalization processing on a signal in the subcarrier by using the equalizer coefficient.

According to a second aspect of the embodiments of the present disclosure, there is provided an adaptive equalization method, used to perform adaptive equalization processing on a frequency-domain signal, a channel used by the frequency-domain signal containing multiple subcarriers, the adaptive equalization method including:

for each subcarrier, generating an equalizer coefficient to which the subcarrier corresponds according to channel information and a step length of the subcarrier; wherein, different subcarriers correspond to different step lengths; and for each subcarrier, performing equalization processing on a signal in the subcarrier by using the equalizer coefficient.

According to a third aspect of the embodiments of the present disclosure, there is provided a receiver, including the adaptive equalizer as described in the second aspect, the receiver further including:

a fast Fourier transformer configured to perform fast Fourier transform on a time-domain signal inputted into the receiver, to generate a frequency-domain signal; and a decision feedback device configured to decide a frequency-domain signal which is equalization processed by the adaptive equalizer, to generate a decision signal, and take a difference between the frequency-domain signal which is equalization processed by the equalizer and the decision signal as an error signal to feed back to the adaptive equalizer.

An advantage of the embodiments of the present disclosure exists in that the subcarriers in the multicarrier communication system correspond to different step lengths, hence, different adaptive equalization processing can be performed on the subcarriers.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

These and/or other aspects and advantages will become apparent and more readily appreciated from the following description of the embodiments, taken in conjunction with the accompanying drawings of which.

Many aspects of the disclosure can be better understood with reference to the following drawings. The components in the drawings are not necessarily to scale, emphasis instead being placed upon clearly illustrating the principles of the present disclosure. To facilitate illustrating and describing some parts of the disclosure, corresponding portions of the drawings may be exaggerated or reduced in size.

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiments.

DETAILED DESCRIPTION

Reference will now be made in detail to the embodiments, examples of which are illustrated in the accompanying drawings, wherein like reference numerals refer to the like elements throughout. The embodiments are described below by referring to the figures.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
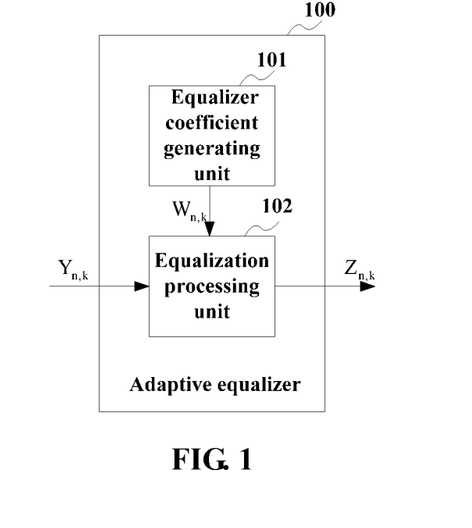
FIG. 1 is a schematic diagram of a structure of the adaptive equalizer of Embodiment 1 of the present disclosure.

An embodiment of the present disclosure provides an adaptive equalizer. FIG. 1 is a schematic diagram of a structure of the adaptive equalizer of Embodiment 1 of the present disclosure. The adaptive equalizer is applicable to a multicarrier communication system, and may be used to perform adaptive equalization processing on a frequency-domain signal. As shown in FIG. 1, the adaptive equalizer 100 includes an equalizer coefficient generating unit 101 and an equalization processing unit 102.

The equalizer coefficient generating unit 101 is configured to, for each subcarrier, generate an equalizer coefficient to which the subcarrier corresponds according to channel information and a step length of the subcarrier, and the equalization processing unit 102 is configured to, for each subcarrier, perform equalization processing on a signal in the subcarrier by using the equalizer coefficient; and, different subcarriers correspond to different step lengths.

The adaptive equalizer of the embodiment of the present disclosure may be applicable to multicarrier communication technologies, such as a discrete multi-tone (DMT) modulation technology, and an orthogonal frequency division multiplexing (OFDM) technology, etc., and the embodiment of the present disclosure is not limited thereto, and is applicable to other multicarrier communication technologies.

In the embodiment of the present disclosure, the adaptive equalizer performs equalization processing on a frequency-domain signal inputted into it, and outputs a processed signal. A function of the equalization processing is to restore a linear damage to which the signal is subjected, and the equalization processing may adopt an algorithm based on a least mean square (LMS) error. The related art may be referred to for a particular algorithm of the LMS error, which shall not be described in this embodiment any further.

During the equalization processing, iteration processing may be performed on the frequency-domain signal. Let $Y_{n,k}$ be a signal of frequency-domain data frame inputted into the adaptive equalizer at an n-th time of equalization processing that is modulated in a k-th subcarrier, $Z_{n,k}$ be a signal of frequency-domain data frame outputted from the adaptive equalizer after the n-th time of equalization processing that is modulated in the k-th subcarrier, $W_{n,k}$ be an equalization coefficient corresponding to the k-th subcarrier at the n-th time of equalization processing, $\mu_k$ be a step length corresponding to the k-th subcarrier, and $W_{n,k}$ be related to channel information and the step length $\mu_k$ of the k-th subcarrier, where, both n and k be natural numbers.

In the embodiment of the present disclosure, a relationship between $W_{n,k}$ and $Z_{n,k}$ may be expressed as formula (1) below:

$$Z_{n,k} = Y_{n,k} W_{n,k} \qquad (1).$$

It can be seen from formula (1) that in the adaptive equalizer, the equalizer coefficient generating unit 101 generates the equalizer coefficient $W_{n,k}$, and the equalization processing unit 102 performs equalization processing on the inputted signal $Y_{n,k}$. In the embodiment of the present disclosure, the equalization processing unit 102 may be a multiplier; however, the embodiment of the present disclosure is not limited thereto, and the function of the equalization processing unit may also be carried out by using other devices.

In the embodiment of the present disclosure, equalization coefficients to which the subcarriers correspond may form a list, the equalization coefficient $W_{n,k}$ to which the k-th subcarrier corresponds may be selected from the list, and equalization processing is performed on the frequency-domain signal modulated in the subcarrier.

Furthermore, equalization processing may be performed on frequency-domain signals in multiple subcarriers, or equalization processing may be performed in turn on frequency-domain signals in each subcarrier.

According to the embodiment of the present disclosure, the subcarriers in the multicarrier communication system correspond to different step lengths, hence, different adaptive equalization processing may be performed on the subcarriers.

The embodiment of the present disclosure shall be described in detail with reference to the accompanying drawings.

Figure 2:
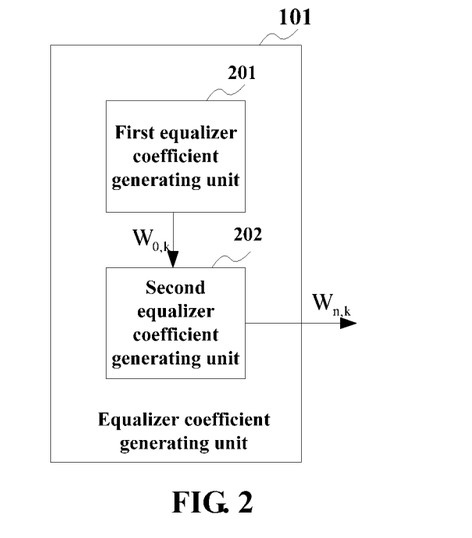
FIG. 2 is a schematic diagram of a structure of the equalizer coefficient generating unit of Embodiment 1 of the present disclosure.

FIG. 2 is a schematic diagram of a structure of the equalizer coefficient generating unit of Embodiment 1 of the present disclosure. As shown in FIG. 2, the equalizer coefficient generating unit 101 of the present disclosure includes a first equalizer coefficient generating unit 201 and a second equalizer coefficient generating unit 202.

The first equalizer coefficient generating unit 201 is configured to generate an initial equalizer coefficient to which the subcarrier corresponds according to the channel information of the subcarrier, for use in performing initial equalization processing on the signal in the subcarrier, and the second equalizer coefficient generating unit 202 is configured to, according to an equalizer coefficient used in this time of equalization processing, the step length and a first parameter corresponding to an error signal after this time of equalization processing, generate an equalizer coefficient used in the next time of equalization processing.

In the embodiment of the present disclosure, the first equalizer coefficient generating unit 201 generates an initial equalizer coefficient $W_{0,k}$ to which the k-th subcarrier corresponds according to the channel information of the k-th subcarrier. Hence, different initial equalizer coefficients are obtained according to channel information of different subcarriers, and different adaptive equalization processing may be performed further on the subcarriers.

In the embodiment of the present disclosure, the channel information of the k-th subcarrier may be obtained in multiple ways, and hence the initial equalizer coefficient $W_{0,k}$ may be obtained. For example, before the multicarrier communication system normally transmits information, channel probing may be performed, so as to measure an initial state of the channel. The embodiment of the present disclosure may obtain an initial equalizer coefficient by using a measurement result at a stage of channel probing, so as to obtain a stable result. The related art may be referred to for a particular implementation of the channel probing, which shall not be described in this embodiment any further.

Let a frequency-domain signal transmitted at the stage of channel probing be $X_0$; where, $X_{0,k}$ is a modulation signal in the k-th subcarrier; a channel response function be $H_0$, $H_{0,k}$ be a channel response function of the k-th subcarrier; a received frequency-domain signal be $Y_0$, $Y_{0,k}$ be a received signal of the k-th subcarrier; then formulae (2) and (3) below may be obtained:

$$Y_{0,k} = H_{0,k} X_{0,k}, \qquad (2)$$

$$X_{0,k} = \left(\frac{1}{H_{0,k}}\right) Y_{0,k} = W_{0,k} Y_{0,k}. \qquad (3)$$

In the embodiment of the present disclosure, it can be seen from formula (3) that $$\frac{1}{H_{0,k}}$$

may be taken as the initial equalizer coefficient $W_{0,k}$.

Under an assumption of slowly varying channel, a change of a channel at a transmission stage after the channel probing is very small, and a reciprocal $$\frac{1}{H_{0,k}}$$

of the channel response functions of the subcarriers obtained at the stage of channel probing is close to an actual convergence value. Therefore, taking $$\frac{1}{H_{0,k}}$$

as the initial equalizer coefficient may obtain a giant convergence probability.

Furthermore, other methods may also be used to obtain the channel information of the k-th subcarrier, hence obtaining the corresponding initial equalizer coefficient $W_{0,k}$; however, the present disclosure is not limited thereto.

In the embodiment of the present disclosure, the initial equalizer coefficient $W_{0,k}$ may be used to perform initial equalization processing on the inputted frequency-domain signal, and further needs to perform an n-th time of equalization processing on an n-th frame of the inputted frequency-domain signal in an iteration process, an equalizer coefficient used in the n-th time of equalization processing being $W_{n,k}$; where, n is a natural number.

In the embodiment of the present disclosure, the equalizer coefficient $W_{n,k}$ may be generated by the second equalizer coefficient generating unit 202. The second equalizer coefficient generating unit 202 may generate the equalizer coefficient $W_{n+1,k}$ used in the next time of equalization processing according to the equalizer coefficient $W_{n,k}$ used in this time of equalization processing, the step length $\mu_k$ and the first parameter $A_{n,k}$ corresponding to the error signal after this time of equalization processing. An equalizer coefficient $W_{1,k}$ used in a first time of equalization processing is generated according to the initial equalizer coefficient $W_{0,k}$, the step length $\mu_k$ and the first parameter $A_{n,k}$ corresponding to the error signal after this time of equalization processing.

Figure 3:
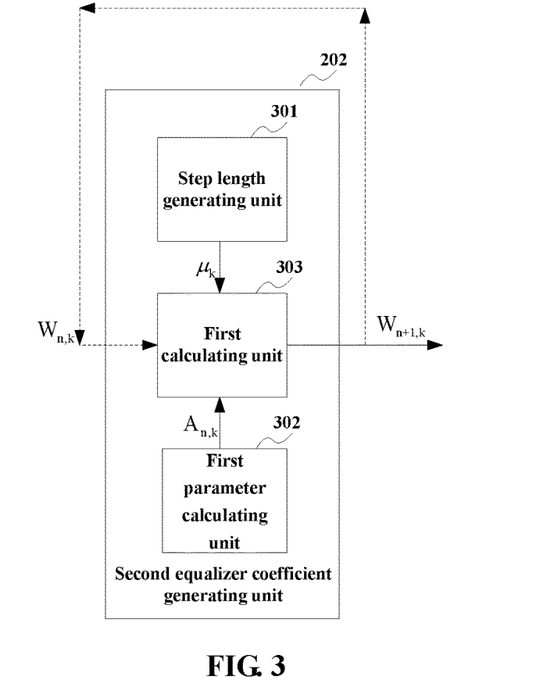
FIG. 3 is a schematic diagram of a structure of the second equalizer coefficient generating unit of Embodiment 1 of the present disclosure.

FIG. 3 is a schematic diagram of a structure of the second equalizer coefficient generating unit of Embodiment 1 of the present disclosure. As shown in FIG. 3, the second equalizer coefficient generating unit 202 of the present disclosure includes a step length generating unit 301, a first parameter calculating unit 302 and a first calculating unit 303.

The step length generating unit 301 generates the step length according to the channel information of the subcarrier, the first parameter calculating unit 302 calculates the first parameter according to the frequency-domain signal and the error signal, and the first calculating unit 303 calculates a difference between a result of multiplication of the step length and the first parameter and the equalizer coefficient used in this time of equalization processing, and takes the difference as the equalizer coefficient used in the next time of equalization processing.

In the embodiment of the present disclosure, the step length generating unit 301 may obtain the step length $\mu_k$ to which the k-th subcarrier corresponds according to the channel information of the subcarrier. As the channel information of the subcarriers are different, different step lengths $\mu_k$ may be obtained for different subcarriers, and different equalizer coefficients may be obtained for different subcarriers, and different equalization processing may be performed.

In the embodiment of the present disclosure, the first parameter calculating unit 302 may obtain the first parameter $A_{n,k}$ according to the frequency-domain signal $Y_{n,k}$ and the error signal $e_{n,k}$ obtained after the n-th time of equalization processing. Hence, the first parameter contains feedback information after the n-th time of equalization processing, which is advantageous to performing adaptive equalization processing according to the feedback information.

In the embodiment of the present disclosure, the first calculating unit 303 obtains the equalizer coefficient $W_{n+1,k}$ used in the next time of equalization processing, i.e. the (n+1)-th time, according to the step length $\mu_k$, the first parameter $A_{n,k}$ and the equalizer coefficient $W_{n,k}$ used in the n-th time of equalization processing. For example, the first calculating unit 303 may calculate $W_{n+1,k}$ by using formula (4) below:

$$W_{n+1,k} = W_{n,k} - \mu_k A_{n,k} \quad (4).$$

Furthermore, the first calculating unit 303 may calculate $W_{1,k}$ by using formula (5) below:

$$W_{1,k} = W_{0,k} - \mu_k A_{0,k} \quad (5).$$

Structures of the step length generating unit 301 and the first parameter calculating unit 302 shall be described below, respectively.

In an adaptive equalization algorithm based on a least mean square (LMS) error, in order to ensure that a calculation result is convergent, the step length $\mu_k$ should satisfy conditions of formula (6) below:

$$0 < \mu_k \leq \frac{1}{2E(Y_{n,k}^2)}; \quad (6)$$

where, $E(Y_{n,k}^2)$ denotes a mean square error of $Y_{n,k}^2$.

Under an assumption of slowly varying channel, $E(Y_{n,k}^2)$ may be approximated as $E(Y_{0,k}^2)$. The following formula (7) may be obtained from formulae (3) and (6):

$$\frac{1}{2E(Y_{n,k}^2)} \approx \frac{1}{E(H_{0,k}^2 X_{0,k}^2)} = \frac{1}{|H_{0,k}^2|E(X_{0,k}^2)} = |W_{0,k}^2|\frac{1}{E(X_{0,k}^2)}. \quad (7)$$

In a case where channel attenuation within the whole transmission bandwidth is intense, a change of $|W_{0,k}^2|$ is very intense, which is often more than 10 dB. Hence, convergence conditions of subcarriers are hard to be satisfied while iteration speeds of the subcarrier are close to each other when a fixed step length is used.

In the embodiment of the present disclosure, the measured $|W_{0,k}^2|$ may be taken as a reference value list of an iterative step length, all reference values adjust the iteration speeds by using a unified step length factor, and $E(X_{0,k}^2)$ is only related to modulation formats of the subcarriers. As changes of mean square errors of the modulation formats at identical average power are much less than those of $|W_{0,k}^2|$, it is very easy to make all the subcarriers obtain relative fast convergence speeds by using a suitable step length factor when the convergence conditions are satisfied.

Figure 4:
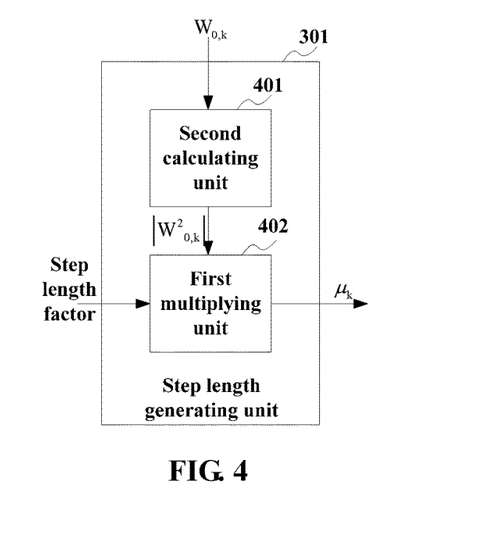
FIG. 4 is a schematic diagram of a structure of the step length generating unit of Embodiment 1 of the present disclosure.

FIG. 4 is a schematic diagram of a structure of the step length generating unit of Embodiment 1 of the present disclosure. As shown in FIG. 4, the step length generating unit 301 may include a second calculating unit 401 and a first multiplying unit 402. The second calculating unit 401 is configured to calculate a square of an absolute value of the initial equalizer coefficient $W_{0,k}$, and the first multiplying unit 402 is configured to multiply a result of calculation of the second calculating unit 401 by a step length factor, so as to generate the step length $\mu_k$.

In the embodiment of the present disclosure, an identical step length factor may be used for all the subcarriers, and the step length factor is able to make all the subcarriers obtain relative fast convergence speeds when the convergence conditions are satisfied, which may be, for example, 0.4. And furthermore, different step length factors may be set for different subcarriers.

In the embodiment of the present disclosure, the step length generating unit 301 may further include a storage unit configured to store the step length factor. Furthermore, the step length generating unit 301 may include another storage unit configured to store the step length $\mu_k$ to which each subcarrier corresponds.

Figure 5:
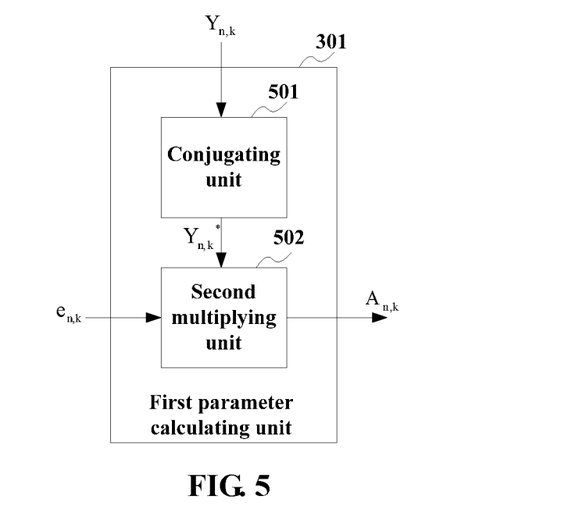
FIG. 5 is a schematic diagram of a structure of the first parameter calculating unit of Embodiment 1 of the present disclosure.

FIG. 5 is a schematic diagram of a structure of the first parameter calculating unit of Embodiment 1 of the present disclosure. As shown in FIG. 5, the first parameter calculating unit 302 may include a conjugating unit 501 and a second multiplying unit 502. The conjugating unit 501 is configured to generate a conjugate signal $Y_{n,k}^*$ of the frequency-domain signal $Y_{n,k}$, and the second multiplying unit 502 is configured to multiply the output signal $Y_{n,k}^*$ of the conjugating unit by the error signal $e_{n,k}$.

In the embodiment of the present disclosure, the error signal $e_{n,k}$ may be generated according to the signal $Z_{n,k}$ generated after the n-th time of equalization processing and a decision signal $\hat{Z}_{n,k}$ for the signal $Z_{n,k}$. For example, $e_{n,k}$ may be obtained from formula (8) below:

$$e_{n,k} = Z_{n,k} - \hat{Z}_{n,k} \quad (8)$$

The related art may be referred to for a method for generating the decision signal $\hat{Z}_{n,k}$ by deciding $Z_{n,k}$, which shall not be described in the embodiment of the present disclosure.

In the embodiment of the present disclosure, the first parameter calculating unit 302 may further include an averaging unit 503 configured to calculate an average value of outputs of the second multiplying unit 502 after accumulation, so as to eliminate an effect of a random noise.

In the embodiment of the present disclosure, the first parameter calculating unit 302 may calculate the first parameter $A_{n,k}$ according to formula (9) below:

$$A_{n,k} = e_{n,k} Y_{n,k}^* \qquad (9)$$

Furthermore, the first parameter calculating unit 302 may calculate the parameter $A_{0,k}$, according to formula (10) below:

$$A_{0,k} = e_{0,k} Y_{0,k}^* \qquad (10)$$

According to the embodiment of the present disclosure, different step length may be set for the subcarriers according to the channel information of the subcarriers, hence, different equalization processing may be performed on different subcarriers. And different initial equalizer coefficients may be set for the subcarriers, thereby further performing different equalization processing on different subcarriers.

Figure 6:
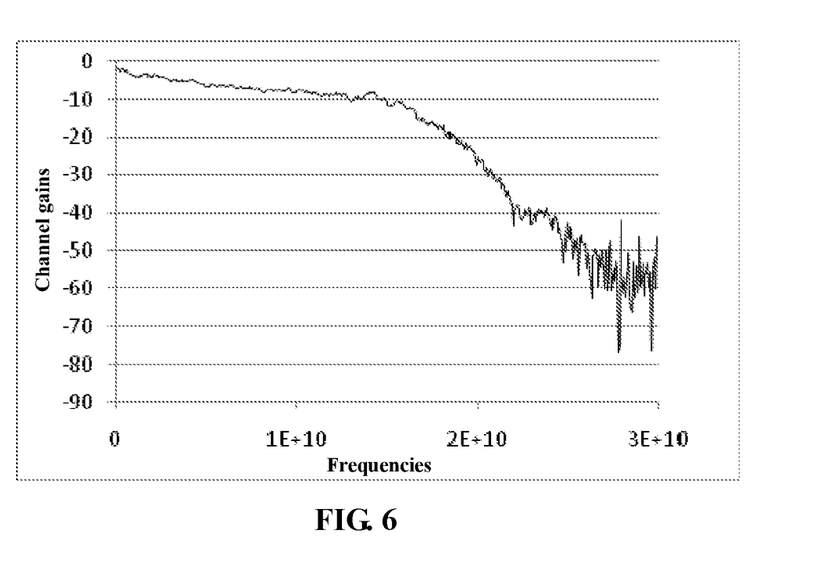
FIG. 6 is a schematic diagram of a channel with a giant difference between frequency band gains.
Figure 7:
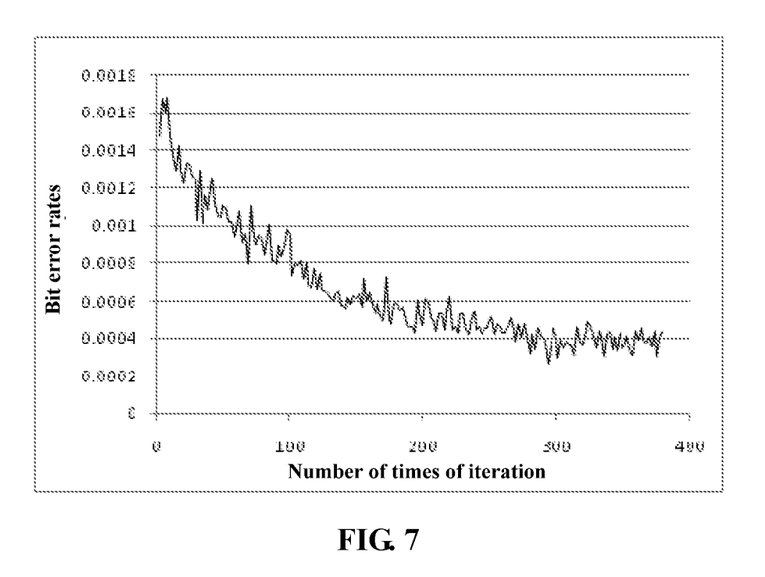
FIG. 7 is a schematic diagram of a change of a BER of a system adopting the equalizer of the embodiment of the present disclosure when a channel gain overall step is increased by 1 db.
Figure 8:
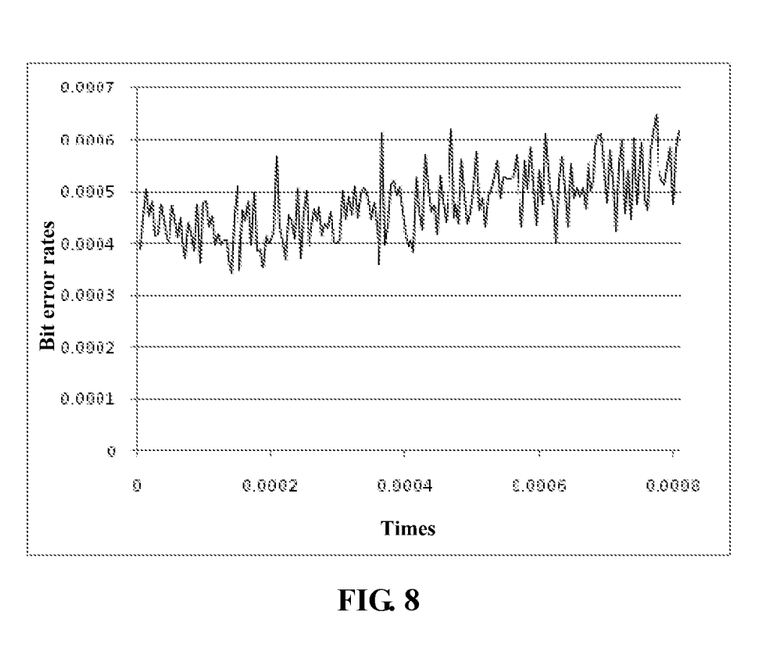
FIG. 8 is a schematic diagram of a change of the BER of the system adopting the equalizer of the embodiment of the present disclosure when a channel overall gain is increased by 1 db within 0.8 ms.

FIG. 6 is a schematic diagram of a channel with a giant difference between frequency band gains, FIG. 7 is a schematic diagram of a change of a BER of a system adopting the equalizer of the embodiment of the present disclosure when a channel gain overall step is increased by 1 db, and FIG. 8 is a schematic diagram of a change of the BER of the system adopting the equalizer of the embodiment of the present disclosure when a channel overall gain is increased by 1 db within 0.8 ms.

It can be seen from FIGS. 7 and 8 that in a case where a channel gain overall step is increased by 1 db, a bit error rate (BER) of the system adopting the equalizer of the embodiment of the present disclosure is increased along with the number of times of iteration, and is gradually stabilized at a relatively low level; and in a case where a channel overall gain is increased by 1 db within 0.8 ms, fluctuation of the BER of the system is small, and may be maintained stably at a relatively low level.

It can be seen from FIGS. 6-8 that by using the adaptive equalizer of the embodiment of the present disclosure, fast convergence and a good tracking effect may still be achieved in a case where the difference between the gains of the subcarriers is very large.

Embodiment 2

Embodiment 2 of the present disclosure provides a receiver, including the adaptive equalizer as described in Embodiment 1.

Figure 9:
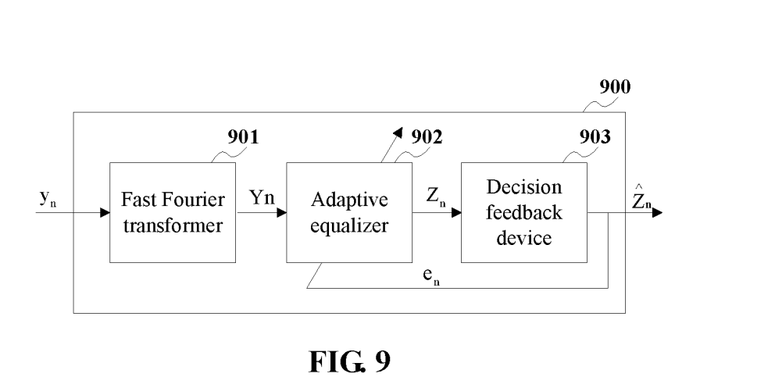
FIG. 9 is a schematic diagram of a structure of the receiver of Embodiment 2 of the present disclosure.

FIG. 9 is a schematic diagram of a structure of the receiver of Embodiment 2 of the present disclosure. As shown in FIG. 9, the receiver 900 of the embodiment of the present disclosure may include a fast Fourier transformer 901, an adaptive equalizer 902 and a decision feedback device 903.

The fast Fourier transformer 901 is configured to perform fast Fourier transform on a time-domain signal inputted into the receiver, so as to generate a frequency-domain signal, channels of the frequency-domain signal containing multiple subcarriers, the adaptive equalizer 902 is configured to perform equalization processing on the frequency-domain signal and output an equalization processed frequency-domain signal, and the decision feedback device 903 is configured to decide a frequency-domain signal which is equalization processed, so as to generate a decision signal, and take a difference between the frequency-domain signal which is equalization processed and the decision signal as an error signal to feed back to the adaptive equalizer.

In the embodiment of the present disclosure, the fast Fourier transformer 901 performs fast Fourier transform (FFT) on the time-domain signal $y_n$ inputted into the receiver, so as to generate the frequency-domain signal $Y_n$. The related art may be referred to for a structure and a principle of the fast Fourier transformer, which shall not be described in the embodiment of the present disclosure any further.

In the embodiment of the present disclosure, the adaptive equalizer 902 performs equalization processing on the frequency-domain signal $Y_n$ and generates a signal $Z_n$. The adaptive equalizer 902 in the embodiment of the present disclosure may be the adaptive equalizer 100 described in Embodiment 1, description of the adaptive equalizer in Embodiment 1 being incorporated herein, and being not going to be repeated herein any further.

In the embodiment of the present disclosure, the decision feedback device 903 decides the signal $Z_n$, so as to generate the decision signal $\hat{Z}_n$, and take the difference between the signal $Z_n$ and the decision signal $\hat{Z}_n$ as the error signal $e_n$ to feed back to the adaptive equalizer. In the embodiment of the present disclosure, the decision feedback device 903 may consist of a determinator and a subtractor. The determinator is configured to generate the decision signal $\hat{Z}_n$ according to the signal $Z_n$, and the subtractor is configured to calculate the difference between the signal $Z_n$ and the decision signal $\hat{Z}_n$, so as to generate the error signal $e_n$. The related art may be referred to for a structure and a principle of the determinator, which shall not be described in the embodiment of the present disclosure any further.

Figure 10:
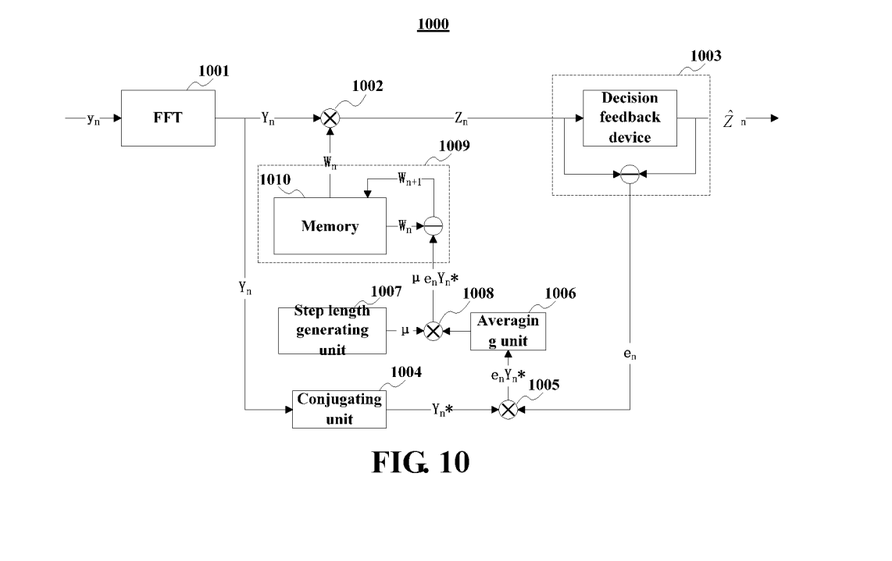
FIG. 10 is a schematic diagram of a constitution of the receiver of Embodiment 2 of the present disclosure.

FIG. 10 is a schematic diagram of a constitution of the receiver of Embodiment 2 of the present disclosure, which is further description of the structure of the receiver shown in FIG. 9.

As shown in FIG. 10, the receiver 1000 of the embodiment of the present disclosure receives a time-domain signal $y_n$, and generates a frequency-domain signal $Y_n$ after being processed by a fast Fourier transformer 1001, a channel of the frequency-domain signal $Y_n$ containing multiple subcarriers; an equalization processing unit 1002 performs equalization processing on the frequency-domain signal $Y_n$ for n times according to an equalizer coefficient $W_n$, so as to generate a signal $Z_n$; a decision signal $\hat{Z}_n$ and an error signal $e_n$ are generated after the signal $Z_n$ is decided by a decision feedback device 1003; a conjugate signal $Y_n^*$ is generated after the frequency-domain signal $Y_n$ is processed by a conjugating unit 1004; the conjugate signal $Y_n^*$ is multiplied by the error signal $e_n$ in a second multiplying unit 1005, so as to generate signals $e_n Y_n^*$; an averaging unit 1006 calculates an average value of the signals $e_n Y_n^*$ after accumulation, so as to eliminate an effect of a random noise; a step length $\mu$ generated by a step length generating unit 1007 is multiplied by an output signal of the averaging unit 1006 in a first multiplying unit 1008, so as to generate $\mu e_n Y_n^*$; an equalizer coefficient generating unit 1009 outputs the equalizer coefficient $W_n$ to the equalization processing unit 1002, for use in the n-th time of equalization processing, and the equalizer coefficient generating unit 1009 further subtracts the equalizer coefficient $W_n$ stored in a memory 1010 by an output signal of the first multiplying unit 1008, so as to obtain an equalizer coefficient $W_{n+1}$, the equalizer coefficient $W_{n+1}$ being used to update the equalizer coefficient $W_n$ stored in a memory 1010, for use in an (n+1)-th time of equalization processing.

In the embodiment of the present disclosure, the fast Fourier transformer 1001 and the decision feedback device 1003 are identical to the fast Fourier transformer 901 and the decision feedback device 903 shown in FIG. 9 with respect to structures and principles, which shall not be described herein any further; and structures and principles of other units shown in FIG. 10 are identical to those of the corresponding units of the adaptive equalizer of Embodiment 1 of the present disclosure, and shall not be described herein any further.

According to the embodiment of the present disclosure, the receiver sets different step lengths for the subcarriers according to the channel information of the subcarriers. Hence, different equalization processing may be performed on different subcarriers, thereby improving performance of the receiver; and furthermore, different initial equalizer coefficients may be set for the subcarriers, thereby further performing different equalization processing on different subcarriers, and further improving the performance of the receiver.

Embodiment 3

Embodiment 3 of the present disclosure provides electronic equipment, including the receiver as described in Embodiment 2.

Figure 11:
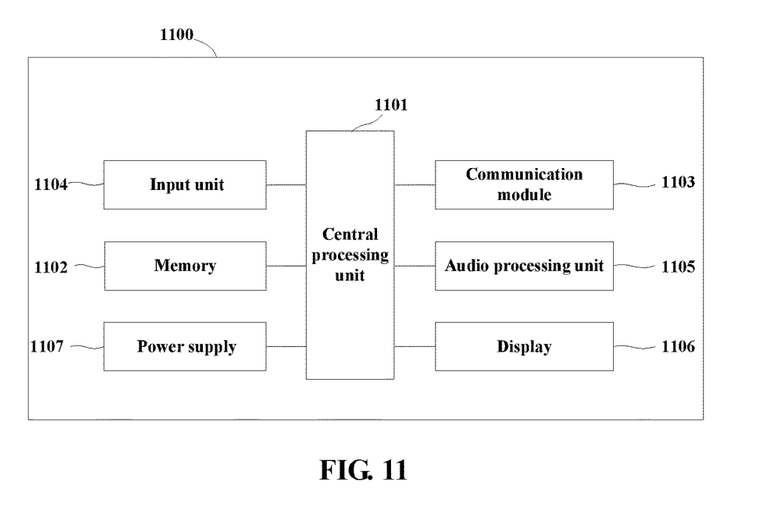
FIG. 11 is a schematic diagram of a structure of the electronic equipment of Embodiment 3 of the present disclosure.

FIG. 11 is a block diagram of a structure of the electronic equipment of Embodiment 3 of the present disclosure. As shown in FIG. 11, the electronic equipment 1100 may be a computer and include a central processing unit 1101 and a memory 1102, the memory 1102 being coupled to the central processing unit 1101. It should be noted that this figure is illustrative only, and other types of structures may also be used, so as to supplement or replace this structure and achieve telecommunications function or other functions.

In an implementation, the functions of the receiver may be integrated into the central processing unit 1101. The central processing unit 1101 may be configured to:
perform fast Fourier transform on a time-domain signal inputted into the receiver, so as to generate a frequency-domain signal Yn, channels used by the frequency-domain signal Yn containing multiple subcarriers; perform equalization processing on the frequency-domain signal Yn according to a result of detection performed on the channels used by the frequency-domain signal Yn; different subcarriers correspond to different step lengths; a decision feedback device decides a frequency-domain signal which is equalization processed, so as to generate a decision signal, and take a difference between the frequency-domain signal which is equalization processed and the decision signal as an error signal to feed back to the adaptive equalizer;
for each subcarrier, generate an equalizer coefficient to which the subcarrier corresponds according to channel information and a step length of the subcarrier; different subcarriers correspond to different step lengths; and for each subcarrier, perform equalization processing on a signal in the subcarrier by using the equalizer coefficient;
generate an initial equalizer coefficient to which the subcarrier corresponds according to the channel information of the subcarrier, for use in performing equalization processing on the signal in the subcarrier; and according to an equalizer coefficient used in this time of equalization processing, the step length and a first parameter corresponding to an error signal after this time of equalization processing, generate an equalizer coefficient used in the next time of equalization processing;
generate the step length according to the channel information of the subcarrier; calculate the first parameter according to the frequency-domain signal and the error signal; and calculate a difference between a result of multiplication of the step length and the first parameter and the equalizer coefficient used in this time of equalization processing, and take the difference as the equalizer coefficient used in the next time of equalization processing;
calculate a square of an absolute value of the initial equalizer coefficient; and multiply the square of the absolute value of the initial equalizer coefficient by a step length factor, so as to generate the step length;
generate a conjugate signal of the frequency-domain signal; and multiply the conjugate signal of the frequency-domain signal by the error signal; and calculate an average value of a result of the multiplication, so as to generate the first parameter.

In another implementation, the receiver and the central processing unit 1101 may be configured separately. For example, the receiver may be configured as a chip connected to the central processing unit 1101, with its functions being realized under control of the central processing unit 1101.

As shown in FIG. 11, the electronic equipment 1100 may further include a communication module 1103 configured to process an output signal of the receiver, an input unit 1104, an audio processing unit 1105, a display 1106 and a power supply 1107. It should be noted that the electronic equipment 1100 does not necessarily include all the parts shown in FIG. 11. And furthermore, the electronic equipment 1100 may include components not shown in FIG. 11, and the related art may be referred to.

As shown in FIG. 11, the central processing unit 1101 is sometimes referred to as a controller or control, and may include a microprocessor or other processor devices and/or logic devices. The central processing unit 1101 receives input and controls operations of every components of the electronic equipment 1100. The memory 1102 may be, for example, one or more of a buffer memory, a flash memory, a hard drive, a mobile medium, a volatile memory, a nonvolatile memory, or other suitable devices, which may store programs executing related information. And the central processing unit 1101 may execute the programs stored in the memory 1102, so as to realize information storage or processing, etc. Functions of other parts are similar to those of the related art, which shall not be described herein any further. The parts of the electronic equipment 1100 may be realized by specific hardware, firmware, software, or any combination thereof, without departing from the scope of the present disclosure.

Embodiment 4

An embodiment of the present disclosure provides an adaptive equalization method, corresponding to the adaptive equalizer in Embodiment 1, with contents identical to those in Embodiment 1 being not going to be described herein any further.

Figure 12:
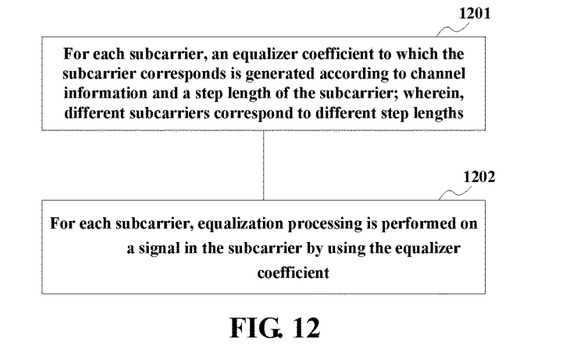
FIG. 12 is a flowchart of the adaptive equalization method of Embodiment 4 of the present disclosure.

FIG. 12 is a flowchart of the adaptive equalization method of Embodiment 4 of the present disclosure. As shown in FIG. 12, the method includes:
step 1201: for each subcarrier, an equalizer coefficient to which the subcarrier corresponds is generated according to channel information and a step length of the subcarrier; different subcarriers correspond to different step lengths; and step 1202: for each subcarrier, equalization processing is performed on a signal in the subcarrier by using the equalizer coefficient.

Figure 13:
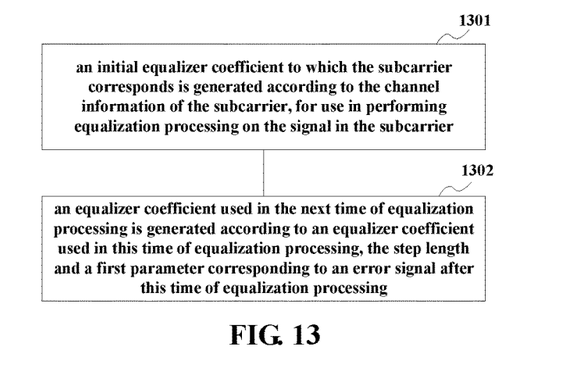
FIG. 13 is a flowchart of a method for generating an equalizer coefficient corresponding to a subcarrier of Embodiment 4 of the present disclosure.

FIG. 13 is a flowchart of a method for generating an equalizer coefficient corresponding to a subcarrier of Embodiment 4 of the present disclosure. As shown in FIG. 13, the method includes:

step 1301: an initial equalizer coefficient to which the subcarrier corresponds is generated according to the channel information of the subcarrier, for use in performing equalization processing on the signal in the subcarrier; and step 1302: an equalizer coefficient used in the next time of equalization processing is generated according to an equalizer coefficient used in this time of equalization processing, the step length and a first parameter corresponding to an error signal after this time of equalization processing.

Figure 14:
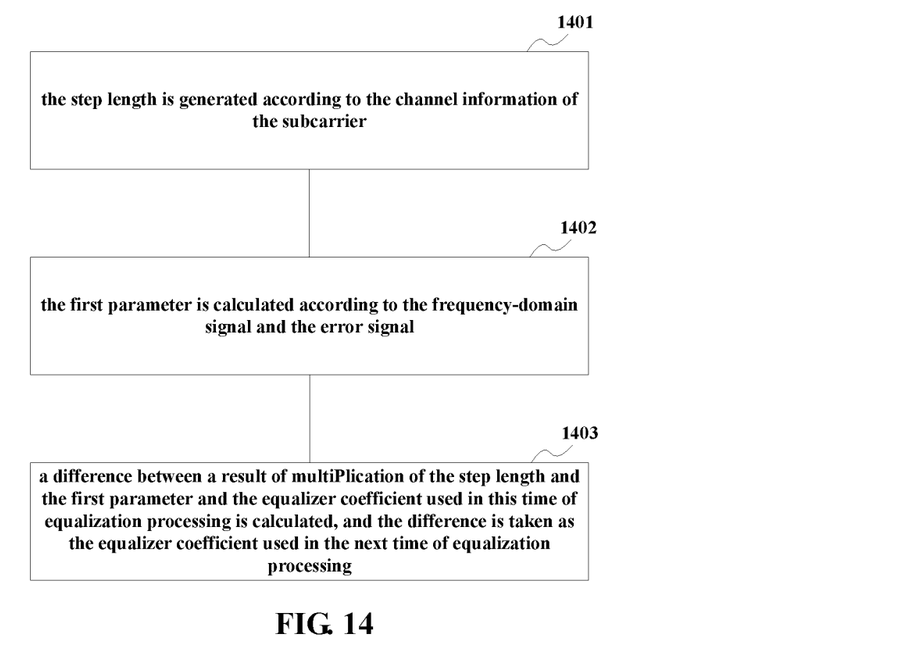
FIG. 14 is a flowchart of the method for generating an equalization coefficient used in the next time of equalization processing of Embodiment 4 of the present disclosure.

FIG. 14 is a flowchart of the method for generating an equalization coefficient used in the next time of equalization processing of Embodiment 4 of the present disclosure. As shown in FIG. 14, the method includes:

step 1401: the step length is generated according to the channel information of the subcarrier;

step 1402: the first parameter is calculated according to the frequency-domain signal and the error signal; and step 1403: a difference between a result of multiplication of the step length and the first parameter and the equalizer coefficient used in this time of equalization processing is calculated, and the difference is taken as the equalizer coefficient used in the next time of equalization processing.

Figure 15:
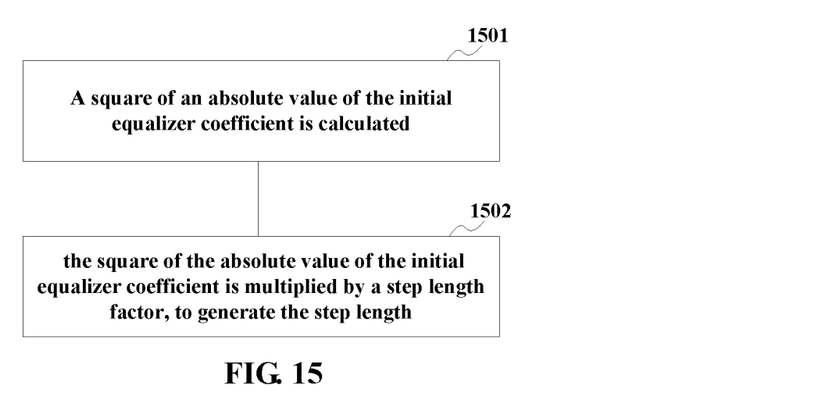
FIG. 15 is a flowchart of the method for generating a step length of Embodiment 4 of the present disclosure.

FIG. 15 is a flowchart of the method for generating a step length of Embodiment 4 of the present disclosure. As shown in FIG. 15, the method includes:

step 1501: a square of an absolute value of the initial equalizer coefficient is calculated; and step 1502: the square of the absolute value of the initial equalizer coefficient is multiplied by a step length factor, to generate the step length.

The particular operational modes of the corresponding units in Embodiment 1 may be referred to for particular operational modes of the steps in this embodiment, which shall not be described herein any further.

According to the embodiment of the present disclosure, different step lengths are set for the subcarriers according to the channel information of the subcarriers. Hence, different equalization processing may be performed on different subcarriers, thereby improving performance of the receiver; and furthermore, different initial equalizer coefficients may be set for the subcarriers, thereby further performing different equalization processing on different subcarriers, and further improving the performance of the receiver.

An embodiment of the present disclosure provides a computer-readable program, when the program is executed in an information processing apparatus or user equipment, the program enables a computer to carry out the adaptive equalization method as described in Embodiment 4 in the information processing apparatus or user equipment.

An embodiment of the present disclosure further provides a storage medium in which a computer-readable program is stored, the computer-readable program enables a computer to carry out the adaptive equalization method as described in Embodiment 4 in an information processing apparatus or user equipment.

An embodiment of the present disclosure provides a computer-readable program, when the program is executed in an information processing apparatus or an eNB, the program enables a computer to carry out the adaptive equalization method as described in Embodiment 4 in the information processing apparatus or eNB.

An embodiment of the present disclosure further provides a non-transitory storage medium in which a computer-readable program is stored, the computer-readable program enables a computer to carry out the adaptive equalization method as described in Embodiment 4 in an information processing apparatus or eNB.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a non-transitory computer readable storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of the present disclosure containing the above embodiments, following supplements are further disclosed.

Supplement 1. An adaptive equalizer, used to perform adaptive equalization processing on a frequency-domain signal, a channel used by the frequency-domain signal containing multiple subcarriers, the adaptive equalizer including:

an equalizer coefficient generating unit configured to, for each subcarrier, generate an equalizer coefficient to which the subcarrier corresponds according to channel information and a step length of the subcarrier; wherein, different subcarriers correspond to different step lengths; and an equalization processing unit configured to, for each subcarrier, perform equalization processing on a signal in the subcarrier by using the equalizer coefficient.

Supplement 2. The adaptive equalizer according to supplement 1, wherein the equalizer coefficient generating unit includes:

a first equalizer coefficient generating unit configured to generate an initial equalizer coefficient to which the subcarrier corresponds according to the channel information of the subcarrier, for use in performing initial equalization processing on the signal in the subcarrier; and a second equalizer coefficient generating unit configured to, according to an equalizer coefficient used in this time of equalization processing, the step length and a first parameter corresponding to an error signal after this time of equalization processing, generate an equalizer coefficient used in the next time of equalization processing.

Supplement 3. The adaptive equalizer according to supplement 2, wherein the second equalizer coefficient generating unit includes:
a step length generating unit configured to generate the step length according to the channel information of the subcarrier;
a first parameter calculating unit configured to calculate the first parameter according to the frequency-domain signal and the error signal; and
a first calculating unit configured to calculate a difference between a result of multiplication of the step length and the first parameter and the equalizer coefficient used in this time of equalization processing, and take the difference as the equalizer coefficient used in the next time of equalization processing.

Supplement 4. The adaptive equalizer according to supplement 3, wherein the step length generating unit includes:
a second calculating unit configured to calculate a square of an absolute value of the initial equalizer coefficient; and
a first multiplying unit configured to multiply a result of calculation of the second calculating unit by a step length factor, to generate the step length.

Supplement 5. The adaptive equalizer according to supplement 3, wherein the first parameter calculating unit includes:
a conjugating unit configured to generate a conjugate signal of the frequency-domain signal; and
a second multiplying unit configured to multiply an output of the conjugating unit by the error signal.

Supplement 6. The adaptive equalizer according to supplement 5, wherein the first parameter calculating unit further includes:
an averaging unit configured to calculate an average value of outputs of the second multiplying unit, to generate the first parameter.

Supplement 7. A receiver, including the adaptive equalizer as described in any one of supplements 1-6, the receiver further including:
a fast Fourier transformer configured to perform fast Fourier transform on a time-domain signal inputted into the receiver, to generate a frequency-domain signal; and
a decision feedback device configured to decide a frequency-domain signal which is equalization processed by the adaptive equalizer, to generate a decision signal, and take a difference between the frequency-domain signal which is equalization processed by the equalizer and the decision signal as an error signal to feed back to the adaptive equalizer.

Supplement 8. An adaptive equalization method, used to perform adaptive equalization processing on a frequency-domain signal, a channel used by the frequency-domain signal containing multiple subcarriers, the adaptive equalization method including:
for each subcarrier, generating an equalizer coefficient to which the subcarrier corresponds according to channel information and a step length of the subcarrier; wherein, different subcarriers correspond to different step lengths; and
for each subcarrier, performing equalization processing on a signal in the subcarrier by using the equalizer coefficient.

Supplement 9. The adaptive equalization method according to supplement 8, wherein the generating an equalizer coefficient to which the subcarrier corresponds includes:
generating an initial equalizer coefficient to which the subcarrier corresponds according to the channel information of the subcarrier, for use in performing equalization processing on the signal in the subcarrier; and
generating an equalizer coefficient used in the next time of equalization processing according to an equalizer coefficient used in this time of equalization processing, the step length and a first parameter corresponding to an error signal after this time of equalization processing.

Supplement 10. The adaptive equalization method according to supplement 9, wherein the generating an equalizer coefficient used in the next time of equalization processing includes:
generating the step length according to the channel information of the subcarrier;
calculating the first parameter according to the frequency-domain signal and the error signal; and
calculating a difference between a result of multiplication of the step length and the first parameter and the equalizer coefficient used in this time of equalization processing, and taking the difference as the equalizer coefficient used in the next time of equalization processing.

Supplement 11. The adaptive equalization method according to supplement 10, wherein the generating the step length includes:
calculating a square of an absolute value of the initial equalizer coefficient; and multiplying the square of the absolute value of the initial equalizer coefficient by a step length factor, to generate the step length.

Supplement 12. The adaptive equalization method according to supplement 11, wherein the calculating the first parameter includes:
generating a conjugate signal of the frequency-domain signal; and multiplying the conjugate signal of the frequency-domain signal by the error signal.

Supplement 13. The adaptive equalization method according to supplement 12, wherein the calculating the first parameter further includes:
calculating an average value of results of the multiplication, to generate the first parameter.

Although a few embodiments have been shown and described, it would be appreciated by those skilled in the art that changes may be made in these embodiments without departing from the principles and spirit thereof, the scope of which is defined in the claims and their equivalents.

What is claimed is:

1. An adaptive equalizer, used to perform adaptive equalization processing on a frequency-domain signal with a channel used by the frequency-domain signal containing multiple subcarriers, the adaptive equalizer comprising:
an equalizer coefficient generator configured to, for each subcarrier, generate an equalizer coefficient to which the each subcarrier corresponds according to channel information and a step length of the each subcarrier where different subcarriers correspond to different step lengths; and
an equalization processor configured to, for each subcarrier, perform equalization processing on a subcarrier signal in the each subcarrier by using the equalizer coefficient.

2. The adaptive equalizer according to claim 1, wherein the equalizer coefficient generator comprises:
a first equalizer coefficient generator configured to generate an initial equalizer coefficient to which the each subcarrier corresponds according to the channel information of the each subcarrier, for use in performing initial equalization processing on the each subcarrier signal in the subcarrier; and a second equalizer coefficient generator configured to, according to a current equalizer coefficient used in this current equalization processing, the step length and a first parameter corresponding to an error signal after the current equalization processing, generate a next equalizer coefficient used in the next equalization processing.

3. The adaptive equalizer according to claim 2, wherein the second equalizer coefficient generator comprises:
a step length generator configured to generate the step length according to the channel information of the each subcarrier;
a first parameter calculator configured to calculate the first parameter according to the frequency-domain signal and the error signal; and
a first calculator configured to calculate a difference between the equalizer coefficient used in the current equalization processing and a result of multiplication of the step length and the first parameter, and use the difference as the next equalizer coefficient used in the next equalization processing.

4. The adaptive equalizer according to claim 3, wherein the step length generator comprises: a second calculator configured to calculate a square of an absolute value of the initial equalizer coefficient; and a first multiplier configured to multiply a result of calculation of the second calculator by a step length factor, to generate the step length.

5. The adaptive equalizer according to claim 3, wherein the first parameter calculator comprises:
a conjugate signal generator configured to generate a conjugate signal of the frequency-domain signal; and
a first parameter multiplier configured to multiply an output of the conjugate signal generator by the error signal.

6. The adaptive equalizer according to claim 5, wherein the first parameter calculator further comprises:
an average value generator configured to calculate an average value of outputs of the first parameter multiplier, to generate the first parameter.

7. A receiver, comprising the adaptive equalizer as described in claim 1, the receiver further comprising:
a fast Fourier transformer configured to perform fast Fourier transform on a time-domain signal input into the receiver, to generate the frequency-domain signal; and
a decision signal and error signal generator configured to determine the frequency-domain signal which is equalization processed by the adaptive equalizer, to generate a decision signal, and use a difference between the frequency-domain signal which is equalization processed by the equalizer and the decision signal as an error signal to feed back to the adaptive equalizer.

8. An adaptive equalization method, used to perform adaptive equalization processing on a frequency-domain signal with a channel used by the frequency-domain signal containing multiple subcarriers, the adaptive equalization method comprising:
for each subcarrier, generating an equalizer coefficient to which the each subcarrier corresponds according to channel information and a step length of the each subcarrier where different subcarriers correspond to different step lengths, and
for each subcarrier, performing equalization processing on a subcarrier signal in the each subcarrier by using the equalizer coefficient.

9. The adaptive equalization method according to claim 8, wherein the generating an equalizer coefficient to which the each subcarrier corresponds comprises:
generating an initial equalizer coefficient to which the each subcarrier corresponds according to the channel information of the each subcarrier, for use in performing equalization processing on the subcarrier signal in the each subcarrier; and
generating an equalizer coefficient used in a next equalization processing according to a current equalizer coefficient used in a current equalization processing, the step length and a first parameter corresponding to an error signal after the current equalization processing.

10. The adaptive equalization method according to claim 9, wherein the generating an equalizer coefficient used in the next equalization processing comprises:
generating the step length according to the channel information of the each subcarrier;
calculating the first parameter according to the frequency-domain signal and the error signal; and
calculating a difference between the current equalizer coefficient used in the current equalization processing and a result of multiplication of the step length and the first parameter, and using the difference as the equalizer coefficient used in the next equalization processing.

11. The adaptive equalization method according to claim 10, wherein the generating the step length comprises: calculating a square of an absolute value of the initial equalizer coefficient; and multiplying the square of the absolute value of the initial equalizer coefficient by a step length factor, to generate the step length.

12. The adaptive equalization method according to claim 11, wherein the calculating the first parameter comprises:
generating a conjugate signal of the frequency-domain signal; and
multiplying the conjugate signal of the frequency-domain signal by the error signal.

13. The adaptive equalization method according to claim 12, wherein the calculating the first parameter further comprises:
calculating an average value of results of the multiplying, to generate the first parameter.

14. A non-transitory computer readable storage storing an adaptive equalization method, used to perform adaptive equalization processing on a frequency-domain signal with a channel used by the frequency-domain signal containing multiple subcarriers, the adaptive equalization method comprising:
generating, for each subcarrier, an equalizer coefficient to which the each subcarrier corresponds according to channel information and a step length of the each subcarrier where different subcarriers correspond to different step lengths, and
performing, for each subcarrier, equalization processing on a subcarrier signal in the each subcarrier by using the equalizer coefficient.

15. An adaptive equalizer, used to perform adaptive equalization processing on a frequency-domain signal with a channel used by the frequency-domain signal containing multiple subcarriers, the adaptive equalizer comprising:
a computer comprising:
an equalizer coefficient generator configured to, for each subcarrier, generate an equalizer coefficient to which the each subcarrier corresponds according to channel information and a step length of the each subcarrier; wherein, different subcarriers correspond to different step lengths; and an equalization processor configured to, for each subcarrier, perform equalization processing on a subcarrier signal in the each subcarrier by using the equalizer coefficient.

\* \* \* \* \*